(12) United States Patent  
Wendt et al.

(10) Patent No.: US 11,366,204 B2  
(45) Date of Patent: Jun. 21, 2022

(54) OPTICAL WAKE-UP DETECTION FOR A USER INTERFACE DEVICE

(71) Applicant: SIGNIFY HOLDING B.V., Eindhoven (NL)

(72) Inventors: Matthias Wendt, Eindhoven (NL); Eduard Gerhard Zondag, Eindhoven (NL); Ulrich Boeke, Eindhoven (NL); Harald Josef Günther Radermacher, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 444 days.

(21) Appl. No.: 16/500,173

(22) PCT Filed: Mar. 27, 2018

(86) PCT No.: PCT/EP2018/057789  
§ 371 (c)(1),  
(2) Date: Oct. 2, 2019

(87) PCT Pub. No.: WO2018/184919  
PCT Pub. Date: Oct. 11, 2018

(65) Prior Publication Data  
US 2021/0103325 A1  Apr. 8, 2021

(30) Foreign Application Priority Data  
Apr. 6, 2017  (EP) .................................. 17165303

(51) Int. Cl.  
*G06F 1/32* (2019.01)  
*G01S 7/481* (2006.01)  
(Continued)

(52) U.S. Cl.  
CPC ............ *G01S 7/4818* (2013.01); *G01S 17/04* (2020.01); *G06F 1/3231* (2013.01);  
(Continued)

(58) Field of Classification Search  
CPC ........................................................ G06F 1/32  
See application file for complete search history.

(56) References Cited

U.S. PATENT DOCUMENTS 4,814,600 A   3/1989  Bergstrom  
2002/0139920 A1  10/2002  Seibel et al.  
(Continued)

FOREIGN PATENT DOCUMENTS

DE  202005010570 U1  9/2005  
EP     2515619 A1  10/2012

*Primary Examiner* — Paul B Yanchus, III

(57) ABSTRACT

The invention relates to a user interface device (1) couple-able to a control unit (2) via a connection cable (3) comprising at least one optical fiber for transporting light. The user interface device (1) comprises a light inlet opening (21) configured to receive light from a region outside a housing (9) of the device (1) and to couple the received light into the first optical fiber (8a) for transmitting the light to the control unit (2) when the user interface device (2) is switched off. Moreover, the invention relates to a control unit (2) couple-able to the user interface device (1) via the connection cable (3). The control unit (2) is configured to detect changes of the light received via the first optical fiber (8a) and to activate power supply to the user interface device (1) to switch on the user interface device (1) based upon the detected changes.

14 Claims, 3 Drawing Sheets

(51) Int. Cl.
  *G01S 17/04* (2020.01)
  *G06F 1/3231* (2019.01)
  *G06F 1/3296* (2019.01)
  *G06F 3/01* (2006.01)
  *H05B 47/105* (2020.01)
  *H05B 47/11* (2020.01)

(52) U.S. Cl.
  CPC ............ *G06F 1/3296* (2013.01); *G06F 3/011* (2013.01); *G06F 3/017* (2013.01); *H05B 47/105* (2020.01); *H05B 47/11* (2020.01); *Y02B 20/40* (2013.01)

(56) References Cited

U.S. PATENT DOCUMENTS

| | | |
|---|---|---|
| 2005/0252754 A1 | 11/2005 | Arnold |
| 2007/0002020 A1 | 1/2007 | Ranta et al. |
| 2013/0159754 A1* | 6/2013 | Wendt ............... H04L 12/40045 713/330 |
| 2013/0215257 A1 | 8/2013 | Huang et al. |
| 2016/0349823 A1* | 12/2016 | Killo .................... G09G 3/2003 |

* cited by examiner

OPTICAL WAKE-UP DETECTION FOR A USER INTERFACE DEVICE

CROSS-REFERENCE TO PRIOR APPLICATIONS

This application is the U.S. National Phase application under 35 U.S.C. § 371 of International Application No. PCT/EP2018/057789, filed on Mar. 27, 2018, which claims the benefit of European Patent Application No. 17165303.3, filed on Apr. 6, 2017. These applications are hereby incorporated by reference herein.

FIELD OF THE INVENTION

The invention relates to an electronic user interface device configured to be coupled to a remote control unit and to a control unit configured to be coupled to the electronic user interface device. Further, the invention is related to a system comprising the electronic user interface device and the control unit.

BACKGROUND OF THE INVENTION

Power distribution systems are known which allow for exchanging data with a device and supplying power to the device via the same connection cable. One related example is the Power over Ethernet (PoE) system standardized by IEEE 803.2. In this system, a powered device can be supplied with power via an Ethernet cable connecting the device with a power sourcing equipment. Such power distribution system may also be used to supply power to electronic user interface devices which are connected to a remote control unit by means of the connection cable. For instance, this makes it possible to supply power to switches, dimmers or other electronic user interface devices of a lighting installation in a building, which are connected to a control unit of the lighting installation, via the connection cables connecting the electronic user interface devices with the control unit. Likewise, electronic user interface devices used in other applications may be supplied with power by a connected control unit via a connection cable.

However, many user interface devices are operated by a user only very infrequently. For instance, a switch or dimmer is only operated when the user wants to switch one more luminaire(s) on or off or when the user wants to change the brightness of one or more luminaire(s). In order to save energy, user interface devices therefore can often be operated in a standby mode in which their power consumption is reduced. In this mode, the interface devices fully activate themselves in case a user input is detected. Moreover, they may provide an illumination in order to make it easier for users to locate the interface devices in dark lighting conditions. The execution of further functions is ideally avoided in the standby mode in order to reduce power consumption as much as possible.

However, the devices usually also consume a certain amount of power when operated in the standby mode. At first, the devices may provide a function for monitoring user input which requires a certain power. Moreover, in case of user interface devices powered via a PoE connection, it is required that a minimum current is constantly flowing to the devices. In addition, it is required to maintain the Ethernet connection such that the devices are ready to receive data via this connection and also for this purpose a certain amount of power is consumed.

EP2515619A1 discloses a lighting installation comprising a light gathering cover which acts as a light pipe and conveys collected ambient light to an optical fiber, which is coupled to a photodetector for measuring the ambient light level. Based on the measured light level the amount of electrical power supplied to the lamp is controlled.

SUMMARY OF THE INVENTION

It is an object of the present invention to reduce the power consumption of a user interface device during periods of time in which the user interface device is not operated by a user.

In accordance with a first aspect, the invention suggests an electronic user interface device included in a housing. The electronic user interface device is configured to be coupled to a remote control unit via a connection cable, the connection cable at least comprising a first optical fiber for transporting light. The user interface device comprises a light inlet opening coupleable with the first optical fiber and configured to receive light from a region outside the housing of the device and to couple the received light into the first optical fiber for transmitting the light to the control unit when the user interface device is switched off.

Using the light received at the light inlet opening of the user interface device transmitted via the optical fiber, it is possible to recognize a desired user interaction with the user interface device in the remote control unit coupled to the use interface device. In particular, it is possible to recognize a user approaching the user interface device in order to operate the device. The user interface device can stay passive in this process and a desired user interaction with the user interface device can be recognized while the user interface device is switched off. Thus, the energy consumption of the user interface can be reduced.

A certain amount of power for recognizing the user interaction is consumed by the control unit. However, the related analysis of the transmitted light can be carried out by a control unit which is operated in an active mode also for other purposes so that the analysis only requires a relatively small amount of additional power. Thus the overall energy consumption can be reduced, particularly compared to a system in which the user interface device is operated in a standby mode, when it is not operated by a user, and which additionally comprises a control unit coupled to the user interface device.

In accordance with a further aspect, the invention suggests a corresponding control unit that is configured to be coupled to the electronic user interface via the connection cable. The control unit is configured to detect changes of the light received from the user interface device via the first optical fiber and to activate power supply to the user interface device to switch on the user interface device based upon the detected changes.

By means of such a control unit the user interface device can be switched on in response to a detection of a user approaching the user interface device based on an analysis of the light transmitted to the control unit from the user interface device. After the user interface device has been switched on it can be operated by the approaching user in order to perform the desired user inputs.

Moreover, in accordance with a further aspect, the invention suggests a system comprising the control unit and the user interface device.

In one embodiment of the invention, the connection cable further comprises at least one transmission wire for supplying the user interface device with power and the control unit is configured to supply power to the user interface device via the transmission wire based upon the detected changes of the light. In this embodiment, the control unit can directly supply the user interface device with power in response to detected changes of the light, in particular in response to changes of the light which are indicative of user approaching the user interface device.

The control unit may be configured to control one or more device(s) on the basis of user inputs at the user interface device. In a related embodiment, the connection cable comprises at least one transmission wire for transmitting data, the user interface device comprises at least one input means for detecting a user input when the user interface device is supplied with power, and the user interface device is configured to transmit a notification about a detected user input to the control unit via the at least one transmission wire of the connection cable. In a further related embodiment, the control unit is connected to a controlled device and the control unit is configured to change an operation state of the controlled device in response to a receipt of the notification via the at least one transmission wire.

The light transmitted from the user interface device to the control unit via the optical fiber may particularly be ambient light received at the inlet opening of the user interface device. When a user approaches the user interface device, he/she may occlude the inlet opening such that light is no longer received at the inlet opening or such that the received light intensity is reduced. Therefore, the control unit may be configured to detect a reduction of the intensity of the light received from the user interface device via the first optical fiber and activate power supply to the user interface device in response to such detection.

In a further embodiment of the invention, the control unit is configured to transmit light generated in the control unit to the user interface device, the user interface device is configured to emit the light into the region outside the housing of the user interface device when the user interface device is switched off and to receive light reflected in the region via the light inlet opening so that the received reflected light is injected into the first optical fiber, and the control unit is configured to activate power supply to the user interface device based upon a detection that it receives reflected light having a minimum light intensity.

This embodiment allows for detecting desired user interactions with the user interface device also in case there is not enough ambient light, which can be received in the inlet opening and analyzed in order detect changes thereof. Therefore, this embodiment does particularly also allow to detect desired user interactions with the user interface device in dark lighting conditions. Moreover, it is one advantage of this embodiment that the light emitted into the region outside the housing of the user interface device also illuminates the user interface device so that it is better visible in dark lighting conditions.

In related embodiments, the light is transmitted from the control unit to the user interface device via a second optical fiber included in the connection cable and emitted by the user interface device via a light outlet opening coupled to the second optical fiber, or the light is transmitted from the control unit to the user interface device via the first optical fiber and emitted by the user interface device via the light inlet opening.

In a further related embodiment, the control unit is configured to determine a time duration of a receipt of reflected light having a minimum light intensity via the first optical fiber and to activate power supply to the user interface device or to perform another control operation dependent upon the time duration. Thus, it is possible for the user to easily and quickly initiate one control operation by shortly approaching the user interface device. The user interface device does not have to be switched on for initiating this control operation. If the user wishes to initiate another control operation, he/she may provide for a longer period of time in which light is reflected so that the user interface device is switched on and can be operated to initiate the control operation.

In one embodiment of the invention, the connection cable comprises a second optical fiber, the control unit is configured to inject light into the second optical fiber so that the light is received in the user interface device via second the optical fiber, the user interface device comprises a light outlet opening coupleable to the second optical fiber for emitting the received light into the region outside the housing of the user interface device when the user interface device is switched off, the light inlet opening is arranged to receive at least part of the emitted light upon it having travelled along an optical path so that the received light is coupled into the first optical fiber, and the control unit is configured to activate power supply to the user interface device in response to a detection of an interruption of a receipt of light via the first optical fiber. In this embodiment, the light outlet opening and the light inlet opening operate similar to a light barrier for detecting a user approaching the user interface device.

In a variant of this embodiment, the control unit is configured to determine a time duration of the interruption of the receipt of the light via the first optical fiber and to activate power supply to the user interface device or to perform another control operation dependent upon the time duration.

In a further embodiment of the invention, the connection cable comprises a plurality of first optical fibers, the user interface device comprises a plurality of light inlet openings, each light inlet opening being coupleable to one of the first optical fibers and being configured to receive light from a region outside the housing of the device and to couple the received light into the respective first optical fiber for transmitting the received light to the control unit when the user interface device is switched off, and the control unit is configured to detected changes of the light received from the user interface device via each of the first optical fibers.

In a related embodiment, one control operation of the control unit is assigned to each of the light inlet openings and wherein the control unit is configured to perform the control operation assigned to a light inlet opening in response to a detection of a change of light received via a first optical fiber coupled to said light inlet opening. Hereby, it is possible for the user to easily and quickly initiate plural control operations by shortly approaching the user interface device such that the light received at the inlet openings changes. The user interface device does not have to be switched on in order to initiate these control operations.

In a further related embodiment, the control unit is configured to determine an order of the first optical fibers in which changes of the light received via the first optical fibers are detected and to activate power supply to the user interface device and/or to perform another control operation based upon the determined order. By determining the order of the first optical fibers in which changes of the light received via the first optical fibers are detected it is particularly possible to assess a direction of a movement of a user when he/she approaches the user interface device. This makes it possible to recognize gestures executed by a hand of the user in one direction (corresponding to one order) or in the reverse direction (corresponding to the reverse order). Likewise, it is possible to determine the direction of the movement of the user's body at the entrance into a room, for example, to determine whether the user enters or leaves the room.

In a further related embodiment, the connection cable comprises a plurality of second optical fibers, the control unit is configured to inject light into each of the second optical fibers so that the light is received in the user interface device via the second optical fibers, the user interface device comprises a plurality of light outlet openings, each light outlet opening being coupleable to one of the second optical fibers for emitting the received light into the region outside the housing of the user interface device when the user interface device is switched off, and each of the light inlet openings is arranged to receive at least part of the light emitted by one of the light outlet openings upon it having travelled along an optical path or upon it having been reflected in the region outside of the housing of the user interface device so that the received light is coupled into the first optical fiber coupleable to the respective light inlet opening.

In a further related embodiment, the control unit is configured to inject light into each of the first optical fibers so that the light is received in the user interface device via the first optical fibers, and the user interface device is configured to emit the light received via the first optical fibers into the region outside the housing of the user interface device via the light inlet openings and to receive light reflected in the region via the light inlet openings so that the received reflected light is injected into the first optical fibers.

It shall be understood that the electronic user interface device of claim 1, the control unit of claim 2 and the system of claim 3 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1A:
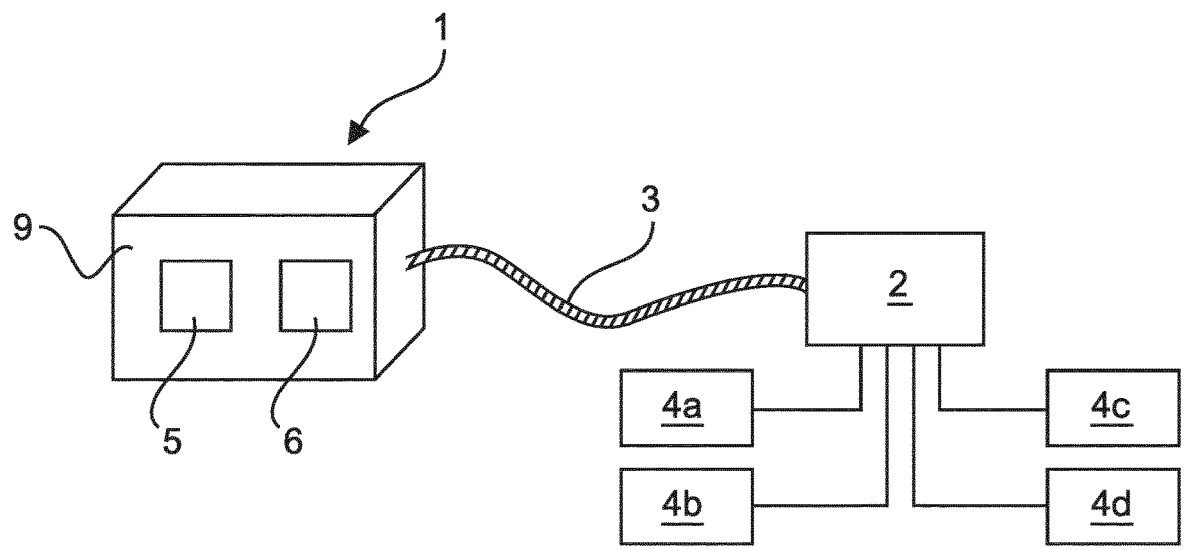
FIG. 1A schematically and exemplarily shows a system comprising a user interface device which can be supplied with power by a control unit, FIG. 1B schematically and exemplarily shows a cross section of a connection cable for connecting the user interface device and the control unit, FIG. 2 schematically and exemplarily shows a user interface device and a control unit in a first embodiment of the system, FIG. 3 schematically and exemplarily shows a user interface device and a control unit in a second embodiment of the system, FIG. 4 schematically and exemplarily shows a user interface device and a control unit in a third embodiment of the system, and FIG. 5 schematically and exemplarily shows a user interface device and a control unit in a further embodiment of the system.

FIG. 1A shows a system comprising a user interface device 1 which is connected with a remote control unit 2 via a connection cable 3. The control unit 2 is configured to control one or more devices 4a, . . . , 4d in response to user inputs at the user interface device 1. In one specific implementation, which will also be referred to herein below by way of example, the system is a lighting system and the controlled devices 4a, . . . , 4d are luminaires which may be switched on and off by means of the control unit 5. In addition, the control unit 2 may be configured to control the brightness of the luminaires and/or further operation parameters of the luminaires, such as the color of the light emitted by the luminaires. However, the invention is limited to an application in a lighting system but can likewise be realized in other system having a structure as shown in FIG. 1A.

The user interface device 1 includes one or more input means 5 for receiving user inputs, which are integrated into a housing 9 of the user interface device. These input means 5 may comprise one or more button(s) and/or more complex input means, such as for example, a touch-screen terminal. Moreover, the user interface device 1 may optionally include a display means 6, such as one or more indicator lamps or a display screen (which may also correspond to the aforementioned touch-screen terminal). The display means 6 may be used for displaying information provided by the control unit 2, which may include data informing the user about the state of the controlled devices 4a, . . . , 4d or prompts for user inputs at the input means, for example.

The input means 5 and the optional display means 6 are coupled to a microprocessor of the user interface device 1 (not shown in the figures). The microprocessor detects user inputs received at the input means 5 and generates corresponding notifications, which are transmitted to the control unit 2 via the connection cable 3. Further, the microprocessor may be configured to receive commands received from the control unit 2 via the connection cable 3 and to control the display means 6 to display information in accordance with the received commands.

In case the system is configured as a lighting system, the input means 5 may particularly allow a user to command changes of the operating state of one or more luminaire(s) included in the system. In particular, input means 5 may allow for commanding the luminaires to be switched on and off. In addition, the input means 5 may allow for commanding the luminaires to change the brightness of the emitted light (this corresponds to dimmer function) and/or to change the color of the emitted light. For commanding such changes, the input means 5 may comprise one or more buttons, which may be configured as push button(s) and/or turning knob(s), or a suitable graphical user interface provided on a touch-screen terminal, for example. If plural luminaires are controlled by means of the input means 5, the input means 5 may be configured such that the user can command changes of the operating state of each of the luminaires individually. For this purpose, the input means 5 may comprise one or more corresponding buttons for each of the luminaire(s), or a graphical user interface provided on a touch-screen terminal may provide corresponding control options, for example.

The display means 6 may indicate the operation state of the one or more luminaire(s) in case the system is a lighting system, particularly with respect to the parameters which are controllable by means of the input means 5. For instance, the display means may indicate whether the luminaire(s) are switched on or off (this is particularly useful in case not all luminaire(s) are visible from the location of the input means 5). In addition, the display means 6 may indicate the current brightness level and/or the current color of the light emitted by the luminaire(s).

Figure 1B:
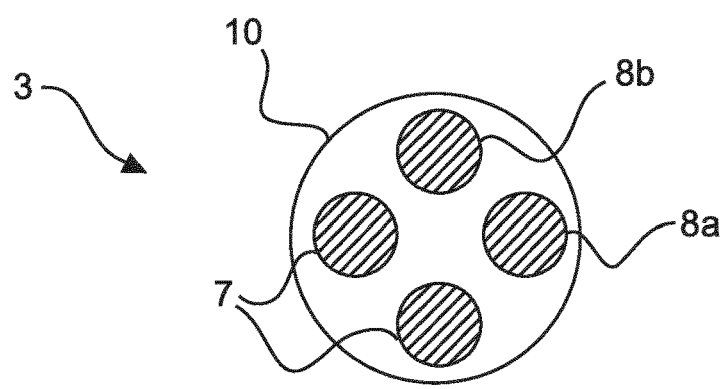

FIG. 1B schematically and exemplarily shows a cross section of the connection cable 3. As illustrated in the FIG. 1B, the connection cable 3 comprises transmission wires 7 for transmitting data from the user interface device 1 to the control unit 2 and vice versa and for supplying the user interface device 1 with power by means of the control unit 2. In one implementation, the transmission cable 3 may comprise a wire pair which is used for transporting data and for transporting power from the control unit 2 to the user interface device. In a further embodiment, the transmission cable may comprise one or more wire(s) which are only used for data transmission and a separate wire pair for supplying power to the user interface device 1.

At the ends of the connection cable 3, plugs are provided which can be connected to corresponding sockets of the interface device 1 and the control unit 2 to connect the transmission wires 7 to communication controllers of the user interface device 1 and the control unit 2 and to power supplying equipment included in the user interface device 1 and the control unit 2. The communication controllers control the data transmission via the transmission wires 7. In the user interface device 1 and the control unit 2, the communication controller may be configured as a separate component or integrated into a microprocessor implementing further functions of the respective device (e.g. the aforementioned microcontroller of the user interface device 1). The power supplying equipment comprises a power source included in the control unit 2 which feeds power to the transmission wires 7, and a power receiving circuit in the user interface device 1, which supplies the user interface device 1 with power received via the transmission wires 7.

In one embodiment, the connection cable is an Ethernet cable and the communication controllers are configured in accordance with the Ethernet specification, particularly included in the IEEE 802.3 standard. In this embodiment, the power supplying equipment is configured in accordance with the PoE specification (IEEE 802.3at). However, the data communication and the power supply via the connection cable may also be configured in another way, such as, for example, in accordance with the USB (Universal Serial Bus) specification.

Moreover, the connection cable 3 is configured as a hybrid cable and comprises one or more optical fiber(s) 8a, 8b for transporting light via the connection cable 3 in addition to the transmission wires 7. The optical fiber(s) 8a, 8b is/are arranged in the inner of the cable jacket 10 together with the transmission wires 7. For connecting the optical fiber(s) 8a, 8b to the user interface device 1 and the control unit 2, the plugs and sockets for connecting the transmission wire 7 with the user interface device 1 and the control unit 2 may comprise respective additional connection points integrated into the plugs and the sockets.

In a further embodiment, one or more separate plug(s) is/are provided at each end of the connection cable 3 for connecting the optical fiber(s) 8a, 8b to the user interface device 1 and the control unit 2 in connection with corresponding sockets included in the user interface device 1 and the control unit 2. In case, the connection cable 3 comprises plural optical fibers 8a, 8b, there may be individual plugs and corresponding sockets for each optical fiber 8a, 8b, or at least some of the optical fibers 8a, 8b may be connected by means of a single plug and a corresponding socket.

As an alternative, in case the connection cable 3 only comprises one optical fiber 8a, the optical fiber 8a may be connected to the user interface device 1 and the control unit 2 via the plugs and sockets for connecting the transmission wires 7 to the user interface device 1 and the control unit 2.

In this embodiment, the bodies of the plugs and sockets may be made of a translucent material which conveys the light transported via the optical fiber 8a to optical interfaces attached to the sockets.

In the system of FIG. 1A, the user interface device 1 is switched off, i.e. is not supplied with power by the control unit 2, when it is not operated by a user. If user operations occur only infrequently, the power consumption of the user interface device 1 can be greatly reduced in this way. Further, the control unit 2 is configured to detect situations in which a user approaches the user interface 1 and to start supplying power to the user interface device 1 in such situations in order to switch on the user interface device 1 so that it can be operated by the user. Upon completion of the user inputs, the control unit 2 may terminate the power supply to the user interface device 1, thereby switching the user interface device 1 off again.

In order to detect that a user approaches the user interface device 1, the control unit 2 analyzes light signals transmitted from the user interface device 1 to the control unit 2 via one or more optical fibers 8a, 8b of the connection cable 3 as will be explained in more detail herein below.

Figure 2:
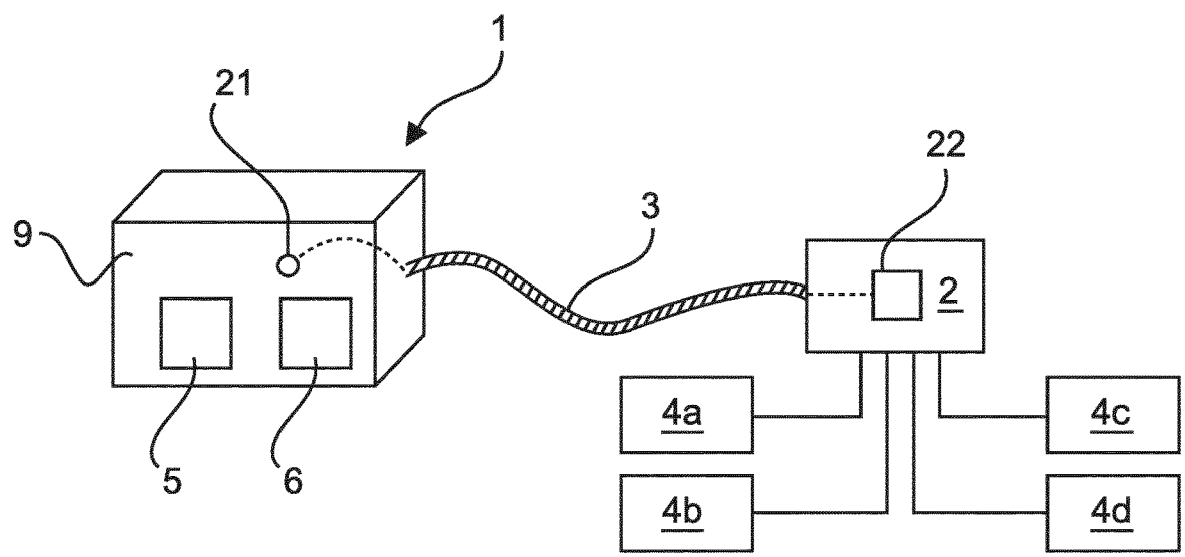

In a first related embodiment schematically and exemplarily illustrated in FIG. 2, the connection cable 3 comprises one optical fiber 8a, which is used to transport light from the user interface device 1 to the control unit 2. Further, the user interface device 1 comprises a light inlet opening 21 to receive ambient light from a region outside the housing 9 of the user interface device 1.

The ambient light may be daylight and/or may be generated by one or more luminaire(s) arranged in the vicinity of the user interface device 1. In particular, the user interface device 1 may be illuminated by the luminaire(s) controllable by means of the user interface device 1 and the control unit 2. This allows for detecting an approaching user in case the luminaire(s) are switched on. In addition or as an alternative, the user interface device 2 may be illuminated by one or more further luminaire(s), which may provide night illumination, for example. In this case, an approaching user can also be detected during night hours when the luminaire(s) controlled by means of the user interface device 1 and the control unit (2) is/are switched off.

From the light inlet opening 21, the ambient light received therein is guided to the optical fiber 8a of the connection cable 3. For this purpose, a plug of the connection cable 3, which terminates the optical fiber 8a, may be directly coupled to the opening. Likewise, the light inlet opening 21 may be optically coupled to the optical fiber 1 in another way. For instance, the user interface device 1 may comprise light guides for guiding the received light through the user interface device 1 and into the optical fiber 8a. Via the optical fiber 8a, the light is transported to the control unit 2. The control unit 2 is configured to detect the light transmitted via the optical fiber 8a. For this purpose, the control unit 2 comprises a light detector 22, such as a photoelectric element, to which the light is guided within the control unit 2.

When a user approaches the user interface device 1 with his/her hand, he/she shadows the light inlet opening 21 so that the ambient light is no longer transmitted to the control unit 2. Therefore, the control unit 2 monitors the received light by means of the light detector 22 and detects interruptions of the receipt of light. If the control unit 2 determines that the receipt of light has been interrupted, it may start supplying the user interface device 1 with power to thereby switch on the user interface device 1. Thereupon, the user interface device 1 can be operated by the approaching user as explained above.

In a refinement of this embodiment, the control unit 2 also determines the time duration of the interruption of the receipt of light and, depending upon the determined time duration, the control unit 2 supplies power to the user interface device 1 or performs a predefined control operation to effect a predefined change of the operation state of the controlled devices 4a, . . . , 4d. In particular, the control unit 2 may compare the determined time duration with a predefined duration and may only start supplying power to the user interface device 1 in case the time duration is longer than the predefined duration. Otherwise, the control unit 2 may perform the predefined control operation.

Hereby, it is possible for the user to effect the predefined change of the operation state of the controlled devices 4a, . . . , 4d by shadowing the opening 21 only for a short period of time. In case the user does not want to effect the predefined change but wishes to perform another control operation, he/she can shadow the opening for a longer period of time. Thereupon, the user interface device 1 is activated by the control unit 2 so that the user can perform the control operation by operating the user interface device 1.

In case, the controlled devices 4a, . . . , 4d are luminaires, the predefined change of the operation state may particularly include a switching-on in case the luminaires are switched off before and a switching-off in case the luminaires are switched on before. This allows a user to turn the luminaires on and off by shortly approaching the user interface device 1 without having to actually operate the user interface device 1. If the user wants to perform more complex control operations by means of the user interface device 1 including, for example, changing the brightness or color of the light emitted by the luminaires, he/she shadows the opening 21 for a longer period of time so that the user interface device 1 is activated.

Figure 3:
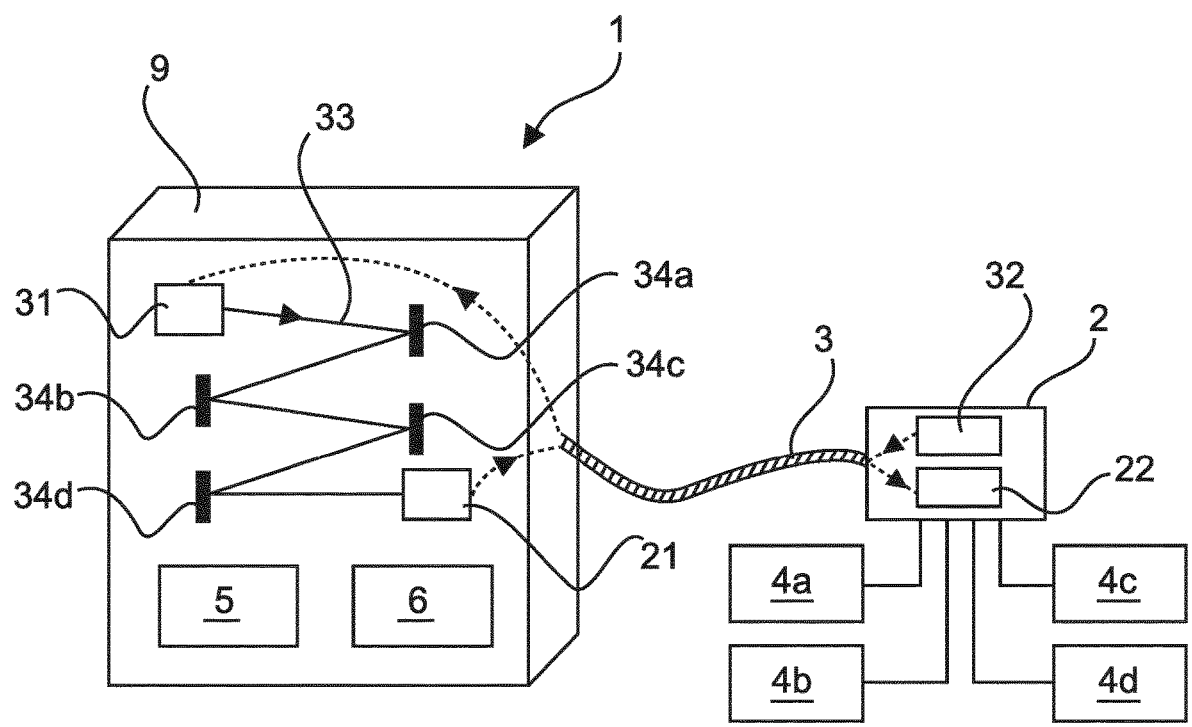

A second embodiment, which is schematically and exemplarily illustrated in FIG. 3, particularly differs from the aforementioned first embodiment in that the user interface device further comprises a light outlet opening 31 emitting light into a region outside the housing 9 of the user interface device 1 and in that the light inlet opening 21 is configured to receive the emitted light. In this embodiment, the light outlet opening 31 and the light inlet opening 21 operate as a light barrier, which is used for detecting users approaching the user interface device 1.

In this embodiment, the connection cable 3 comprises two optical fibers 8a and 8b. The first optical fiber 8a is again coupled with the light inlet opening 21 and transports light received via the light inlet opening 21 to the control unit 2 similar to the first embodiment described above. In the control unit 2, the light received via the first optical fiber 8a is likewise detected by means of a light detector 22. The second optical fiber 8b is optically coupled to a light source 32 included in the control unit 2 so that light emitted by the light source 32 is injected into the second optical fiber 8b. The light source 32 may comprise one or more LED(s) (light emitting diode(s)), for example. Since LEDs only require relatively low power, this allows for a power-saving generation of the light. On the side of the user interface device 1, the second optical fiber 8b is coupled to a light outlet opening 31 emitting the light into a region outside the housing 9 of the user interface device 1.

As said above, the light outlet opening 31 and the light inlet opening 21 are configured and arranged such light emitted by the light outlet opening 31 is received in the light inlet opening 21. For this purpose, the light outlet opening 31 is preferably configured to emit a directed light beam which travels to the light inlet opening 21 along a defined optical path 33. In order to form the light beam, the light outlet opening 31 may comprise suitable optics including on or more lens(es). The light path may correspond to a straight line between the light outlet opening 31 and the light inlet opening 21. Alternately, the optical path comprises one or more deflection points, where the light is reflected by mirrors 34a, . . . , 34d. Hereby, the light beam travels through a larger region. In this alternative, the optical path may particularly have a zigzag form as illustrated in FIG. 3. However, other forms of the optical path are likewise possible.

When a user approaches the user interface device 1 with his/her hand and crosses the optical path, the user interrupts the light beam so that the light is no longer received in the control unit 2 via the first optical fiber 8a. Therefore, the control unit 2 detects interruptions of the receipt of light via the optical fiber 8a by means of the light detector 22. When an interruption of the receipt of light is detected, the control unit 2 may start supplying the user interface device 1 with power to thereby switch on the user interface device 1. In refinement of this embodiment, the control unit 1 may again determine the time duration of the interruption of the receipt of light and start supplying power to the user interface device 1 or perform another control operation, such as a switching-on or switching-off of one or more luminaire(s) controlled by the control unit 2, as already described above.

The light emitted by the light source 32 and detected by the light detector 22 may be visible light or invisible light, such as infrared or ultraviolet light. The use of visible light has the advantage that the light emitted by the light outlet opening 32 of the user interface device 1 also illuminates the user interface device 1. Thus, the user interface device 1 is better visible in dark lighting conditions and can more easily be found by users wishing to operate the user interface device 1 in such lighting conditions, e.g. users that enter a dark room and want to turn on the luminaire(s) in the room. However, in certain circumstances, it may be desired that the user interface device 1 does not emit visible light, e.g. in order to avoid any disturbance of individuals. In this case, invisible light may be used.

Further, the light beam emitted by the light outlet opening 31 and traveling along the optical path 33 may be continuous. In order to achieve this, the light source 32 is operated such that it continuously emits light. In an alternative implementation, a pulsed light beam is provided. For this purpose, the light source 32 is operated in a pulsed operation mode. Hereby, the overall power consumption of the light source 32 can be reduced. In this implementation, the light detection by means of the light detector 22 may be synchronized with the pulsed operation of the light source 32 and the control unit 2 may determine whether the light pulses emitted by the light source 32 are received by the light detector 22. An interruption of the receipt of light may be detected in case one or more pulses are not received.

In order to assess the time duration of the interruption of the receipt of light in this embodiment, the control unit 2 may determine the number of emitted pulses which are not received by the light detector 22. This number may be compared with a predetermined threshold to determine whether the user interface device 1 is to be supplied with power (e.g. in case the determined number is smaller than the threshold) or whether another control operation is performed as described above (e.g. in case the determined number is larger than the threshold).

In a third embodiment, the user interface device 1 likewise emits light, which is generated by a light source 32 of the control unit 2 and transported to the user interface device 1 via the connection cable 3, into an area outside the housing 9 of the user interface device 1. An approaching user is detected in this embodiment by detecting light reflected by the user (e.g. by his hand) in the control unit 2. For this purpose, reflected light is transported from the user interface device 1 to the control unit 2 via the connection cable 3. When the control unit 1 detects reflected light, it may start supplying power to the user interface device 1 and/or decide whether to start supplying power to the user interface device 1 or to perform another control operation depending on the time duration in which reflected light is received.

Figure 4:
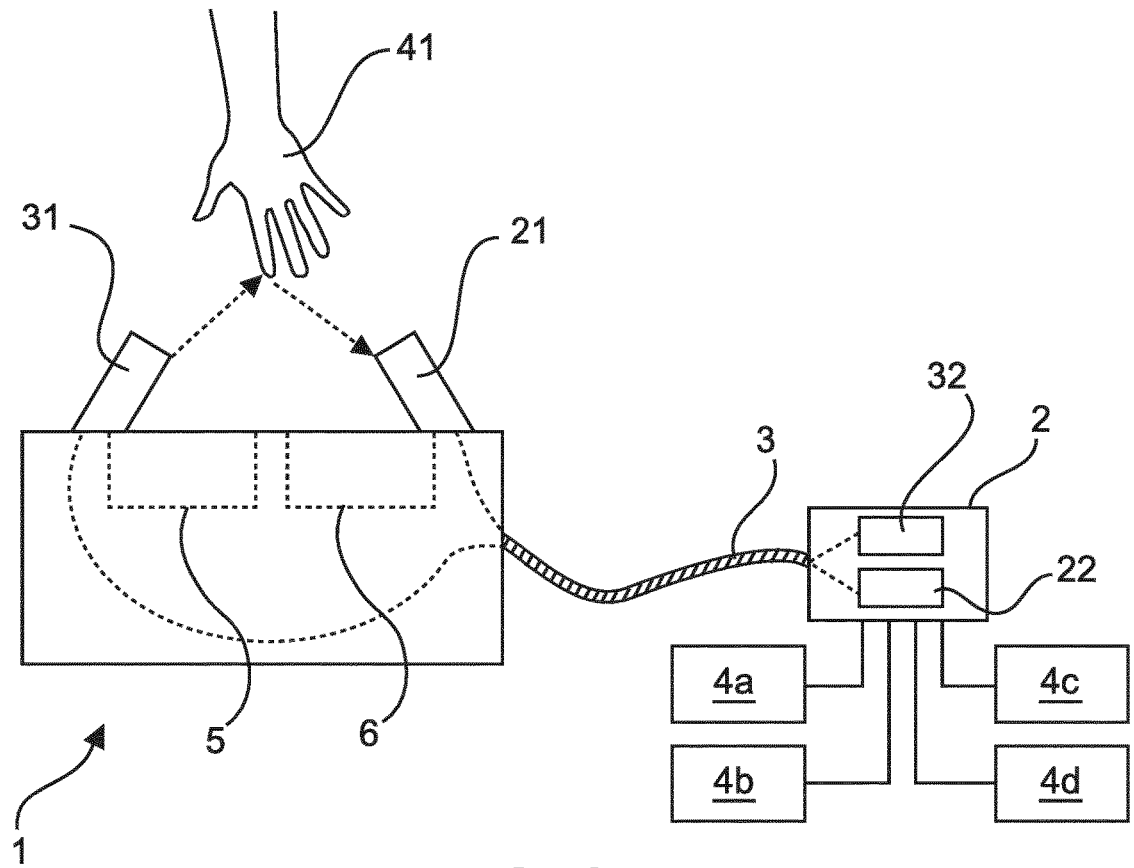

In one implementation of this embodiment illustrated in FIG. 4, the control unit 2 again includes a light source 32, such as an LED, which is optically coupled to the second optical fiber 8b of the hybrid connection cable 3. In the user interface device 1 (a cross section of which is shown in FIG. 4), the optical fiber 8b is optically coupled to a light outlet opening 31 through which the light received via the optical fiber 8a is emitted into a region outside the housing 9 of the user interface device 1. Further, the user interface device 1 comprises a light inlet opening 21 which is arranged such that it receives at least part of the emitted light after it has been reflected by a user approaching the user interface device 1 with his/her hand 41, for example. The light inlet opening 21 is optically coupled to the first optical fiber 8a of the connection cable 3 so that light received at the light inlet opening 21 is transported to the control unit 2 via the first optical fiber 8a. In the control unit 2, the first optical fiber 8a is optically coupled to a light detector 22 to detect reflected light received at the light inlet opening 21 of the user interface device 1.

In this configuration, the control unit 2 monitors the light intensity received via the first optical fiber 8a by means of the light detector 22. In case, it detects a light intensity above a threshold value, it may be assumed that light has been reflected by an approaching user. Therefore, the control unit 2 may start supplying power to the user interface device 1 in case a light intensity above the threshold value is detected. In a refinement, the control unit 1 further determines the time duration in which light is reflected in the relevant region outside the outside the housing 9 of the user interface device 1 and starts supplying power to the user interface device 1 or performs another predefined control operation dependent upon the time duration as explained above in connection with the time duration of an interruption of the receipt of light. In order to determine the time duration in which light is reflected in the relevant, the control unit 2 may determining the time duration in which the light intensity is greater than the threshold value.

A further implementation of the third embodiment differs from the aforementioned implementation in that one optical fiber 8a is used for transporting light to be emitted by the user interface device 1 from the control unit 2 to the user interface device and for transporting reflected light from the user interface device 1 to the control unit 2. In this implementation, the light generated by the light source 32 of the control unit 2 is transmitted to the user interface device 1 via the optical fiber 8a of the connection cable 3 and emitted via the opening 51 of the user interface device 1 in a region outside the housing of the user interface device 1. Further, the opening 51 also serves as light inlet opening for receiving reflected light from the relevant region.

The received reflected light is transported to the control unit 2 via the optical fiber 8a along the optical path of the light emitted by the light source 32. In the control unit 2, the reflected light is detected by the light detector 22. When reflected light is detected, the control unit 1 may start supplying power to the user interface device 1 and/or decide whether to start supplying power to the user interface device 1 or to perform another control operation depending on the time duration in which reflected light is received.

Figure 5:
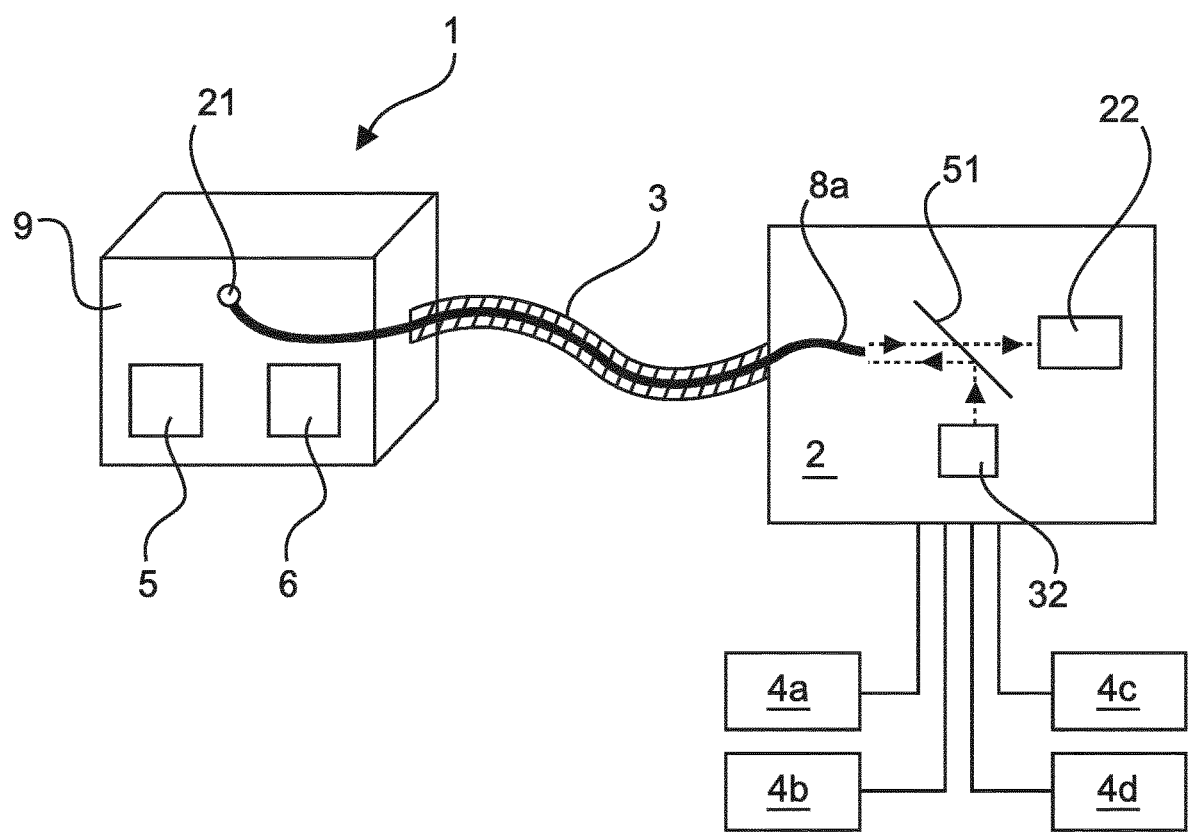

In one realization of this implementation, which is illustrated in FIG. 5, a semi-permeable mirror 51 is arranged in the optical path of the received light and the light detector 22 receives the light through the semi-permeable mirror 51. Further, the light emitted by the light source 32 is coupled into the optical path via reflection at the semi-permeable mirror 51 so that it is injected into the optical fiber 8a. As an alternative, the light detector 22 may be positioned in the vicinity of the light source 32 such that it receives light from the optical fiber 8a and does not directly receive light from the light source 32.

In variants of this implementation, the reflected light is analyzed by the light detector 22 to detect reflections by a user approaching the user interface device 1 and to distinguish such reflections from reflections inside the control unit 2 or the user interface device 2. Hereby, the reliability of the detection can be improved. In order to achieve this, use may be made of the fact that the human skin (of a user approaching the user interface device 1) reflects light in a certain wavelength region, which particularly corresponds to a region of the visible spectrum with smaller wavelengths, to a greater extent than in other wavelength regions.

In one related variant, the light source 32 may be configured to emit white light and the light detector 22 may be configured to determine the light intensity in the relevant wavelength region. When an increased light intensity in this wavelength region is determined, a reflection by a user approaching the user interface device 1 is detected. In order to determine the light intensity in the relevant wavelength region, the light detector 22 may comprise a spectrometer or it may only be sensitive in the relevant wavelength region.

As an alternative, the light source 32 may be configured to sequentially emit light in different wavelength regions including the relevant wavelength region. Moreover, it may be determined by means of the light detector 22 whether the light intensity received when the light source 32 emits light in the relevant wavelength region is higher than the light intensity received when the light source emits light in other wavelength region. If this is the case, a reflection by a user approaching the user interface device 1 is detected.

In these variants, the control unit 1 may start supplying power to the user interface device 1 if a reflection by a user approaching the user interface device 1 is detected and/or decide whether to start supplying power to the user interface device 1 or to perform another control operation depending on the time duration of such reflections.

In the aforementioned implementations, in which reflected light is detected in the control unit 2, the light generated by the light source may again be visible light or invisible light. If visible light is used, this light again also illuminates the user interface device 1 to ease finding the user interface device 1 in dark lighting conditions.

Further, the light source 32 may continuously emit light or it may be operated in pulsed mode in which it emits consecutive light pulses. In the latter case, the control unit 2 determines whether one or more light pulses are reflected in the region outside the housing 9 of the user interface device 1 by monitoring the light intensity measured by means of the light detector 22. If reflections are detected for one or more light pulse(s), the control unit 2 supplies power to the user interface device 1 or performs a predefined control operation as described above. In order to perform the optional assessment of the time duration in which light is reflected in the relevant region outside the housing of the user interface device in this embodiment, the control unit 2 may determine the number of consecutive light pulses for which reflections are detected. This number may then again be compared with a predetermined threshold to determine whether the user interface device 1 is to be supplied with power or whether another control operation is to be performed as described above.

In further embodiments, the user interface device 1 comprises two or more light inlet openings 21 for receiving light from a region outside the housing 9 of the user interface device 1. In different variants, the received light may be ambient light as described in connection with the first embodiment described above, light emitted by one or more light outlet opening(s) 31 which is guided to the light inlet openings 21 along defined paths as described in connection with the second embodiment above, or light emitted by one or more light outlet openings 31, which is received at the light inlet openings 21 upon reflection as describe above in connection with the third embodiment above. Each of the light outlet openings 31 is optically coupled to a respective optical fiber 8b of the connection cable trough which light which is generated in the control unit 2 is transported to the light outlet openings 31 to be emitted into a region outside the housing 9 of the user interface device 1 by the light outlet openings 31.

Each of the light inlet openings 21 is optically coupled to an optical fiber of the connection cable 3 through which the light received by the respective light inlet opening 21 is transported to the control unit 2. When reflected light is received by the light inlet openings 21, the emitted light and the reflected light may also be transported via the same optical fiber 8a and the light inlet opening 21 may also emit the light (i.e. it may also serve as a light outlet opening 31) as described above. In the control unit 2, the light received via each of the optical fibers 8a assigned to the light inlet openings 21 is analyzed by means of a respective light detector 21, particularly in order to detect interruptions of the receipt of light or—in case the analyzed light is reflected light—to detect that light is received. Such detections are also referred to as detection events herein below. Optionally, the control unit 2 may also determine the duration of the detection events, which corresponds to the time duration in which the receipt of light is interrupted or—in case the analyzed light is reflected light—to the duration in which light is received.

In one implementation, each of the light inlet openings 21 is assigned to one control operation to be performed by control unit 21 and when the occurrence of a detection event is determined for one of the light inlet openings 21 the control unit 2 may perform the function or control operation assigned to the respective light inlet opening 21. For instance, the control operation assigned to one light inlet opening 21 may comprise that the control unit 2 starts supplying power to the user interface device 1 and the predefined control operation(s) assigned to one or more further light inlet openings 21 may comprise control operations for changing the operation state of the device 4a, . . . , 4d controlled by the control unit 2. In such a way, an approaching user can either activate the user interface device 1 or directly effect a predefined change of the operation state of the controlled devices 4a, . . . , 4d by approaching one of the light inlet openings 21.

In a variant, each of the light inlet openings 21 is assigned to one control operation for changing the operation state of the controlled devices 4a, . . . 4d. Moreover, the control unit 2 determines the duration of a detection event occurring for a light inlet opening 21 and performs the control operation assigned to the light inlet opening 21 in case the determined duration is shorter than the predefined duration. In case the determined duration is longer than the predetermined duration, the control unit 2 may start supplying power to the user interface device 1 in order to turn the user interface device 1 on.

In case the controlled devices 4a, . . . , 4d are luminaires, the luminaires may be divided into groups of one or more luminaire(s) and one light inlet opening 21 may particularly be allocated to each of the groups in the aforementioned implementations and the control operation assigned to the light inlet opening 21 assigned to one group may comprise switching-on or switching-off the luminaire(s) of the group. Thus, the user can switch on and off the luminaires individually or in groups of several luminaires by causing detection events for the respective light inlet openings 21 of the user interface device 1. In case more complex user inputs are desired, the user can activate the user interface device 1 as explained above.

In a further implementation, the plural light inlet openings 21 are arranged substantially along a straight line and the control unit 2 is configured to determine an order in which successive detection events occur for the light inlet openings 21. Moreover, the control unit 2 may be configured to determine a direction along the straight line in which successive detection events occur for the light inlet openings 2. Hereby, the control unit 2 can particularly determine a direction (with respect to the line) of a user's movement, when the user approaches the user interface device 1.

Both possible directions may be assigned with one control operation for changing the operation state of the controlled devices 4a, . . . 4d and upon having determined a direction for a series of detection events in accordance with the order in which the detection events occur for the light inlet openings 21, the control unit 2 may perform the associated control operation. Further, the control unit 2 may determine the duration of the successive detection events and may be configured such that the control operations assigned to the directions are only performed, if each of the determined durations is shorter than a predefined duration. Otherwise, the control unit 2 may start supplying the user interface device with power.

If the controlled devices 4a, . . . , 4d are luminaires, the control operation assigned to one direction may be a switching on of the luminaires and the control operation assigned to the opposite direction may a switching off of the luminaires. Hence, the user can effectively switch the luminaires on and off by wiping along the line of light inlet openings in one or the other directions. Further, the user interface device 1 may be arranged in the vicinity of an entrance into a room and may be configured such that users can cause detection events when they move through the entrance close to the user interface device 1 (and may not cause detection events when the move in a greater distance to the user interface device). In this case, the control unit 2 may determine on the basis of the order of the detection events whether a user causing detection events enters or leaves the room and it may switch the luminaires on when the user enters the room and may switch the luminaires off when the user leaves the room.

In a different variant, the user may input a security code by causing detection events for the plural light input openings 21 in a predetermined order of the light input openings 21. In this variant, the control unit 21 is configured to check whether a detected order of detection events for the light input openings 21 corresponds to the security code. If this is the case, the control unit 2 may perform a predefined operation, which may comprise starting to supply power to the user interface device 1. Otherwise, the control unit 21 may not perform an operation. In this way, an access control to the user interface device 1 can be established and an authorized user can activate the user interface device 1 by inputting the security code as described above.

In the embodiments described above, the user interface device 1 is supplied with power via a transmission wire 7 included in the connection cable 3 between the user interface device 1 and the control unit 2 which also includes the optical fiber(s) 8a, 8b. However, it is likewise possible that a further connection cable between the interface device 1 and the control unit 2 is provided in order to supply the user interface device 1 with power. Moreover, the optical fiber(s) 8a, 8b may be included in separate dedicated cable which does also not comprise transmission wires for transmitting data.

Further, the user interface device 1 may not be supplied with power by the control unit 2. Rather, another power source may be provided for supplying the user interface device 1 with power, such as, for example, a battery of the user interface device 1 or a photovoltaic power source. In order to activate power supply to the user interface device 1 in these embodiments, the control unit 2 may operate a corresponding switch connecting the user interface device 1 and the power source. For example, the switch may be electronically coupled to the control unit 1 and may be operated by a power signal applied by the control unit 2. Further, the switch may be configured such that it does not consume energy when it is not operated.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An electronic user interface device included in a housing, the electronic user interface device being configured to be coupled to a remote control unit via a connection cable, the connection cable at least comprising a first optical fiber for transporting light,
wherein the user interface device comprises a light inlet opening coupleable with the first optical fiber and configured to receive light from a region outside the housing of the device and to couple the received light into the first optical fiber for transmitting the light to the control unit when the user interface device is switched off; and
wherein the control unit is configured to detect changes of the light received from the user interface device via the first optical fiber and to activate power supply to the user interface device to switch on the user interface device based upon the detected changes in response to a detection of a user approaching the user interface device with his/her hand.

2. A system comprising an electronic user interface device and a control unit as defined in claim 1.

3. The system as defined in claim 2, wherein the connection cable further comprises at least one transmission wire for supplying the user interface device with power and wherein the control unit is configured to supply power to the user interface device via the transmission wire based upon the detected changes of the light.

4. The system as defined in claim 2, wherein
the control unit is configured to transmit light generated in the control unit to the user interface device,
the user interface device is configured to emit the light into the region outside the housing of the user interface device when the user interface device is switched off and to receive light reflected in the region via the light inlet opening so that the received reflected light is injected into the first optical fiber, and
the control unit is configured to activate power supply to the user interface device based upon a detection that it receives reflected light having a minimum light intensity.

5. The system as defined in claim 4, wherein the light is transmitted from the control unit to the user interface device via a second optical fiber included in the connection cable and emitted by the user interface device via a light outlet opening coupled to the second optical fiber, or
wherein the light is transmitted from the control unit to the user interface device via the first optical fiber and emitted by the user interface device via the light inlet opening.

6. The system as defined in claim 4, wherein the control unit is configured to determine a time duration of a receipt of reflected light having a minimum light intensity via the first optical fiber and to activate power supply to the user interface device or to perform another control operation dependent upon the time duration.

7. The system as defined in claim 2, wherein
the connection cable comprises a second optical fiber,
the control unit is configured to inject light into the second optical fiber so that the light is received in the user interface device via second the optical fiber,
the user interface device comprises a light outlet opening coupleable to the second optical fiber for emitting the received light into the region outside the housing of the user interface device when the user interface device is switched off,
the light inlet opening is arranged to receive at least part of the emitted light upon it having travelled along an optical path so that the received light is coupled into the first optical fiber, and
the control unit is configured to activate power supply to the user interface device in response to a detection of an interruption of a receipt of light via the first optical fiber.

8. The system as defined in claim 2, wherein
the connection cable comprises a plurality of first optical fibers,
the user interface device comprises a plurality of light inlet openings, each light inlet opening being coupleable to one of the first optical fibers and being configured to receive light from a region outside the housing of the device and to couple the received light into the respective first optical fiber for transmitting the received light to the control unit when the user interface device is switched off, and the control unit is configured to detected changes of the light received from the user interface device via each of the first optical fibers.

9. The system as defined in claim 8, wherein one control operation of the control unit is assigned to each of the light inlet openings and wherein the control unit is configured to perform the control operation assigned to a light inlet opening in response to a detection of a change of light received via a first optical fiber coupled to said light inlet opening.

10. The system as defined in claim 8, wherein the control unit is configured to determine an order of the first optical fibers in which changes of the light received via the first optical fibers are detected and to activate power supply to the user interface device and/or to perform another control operation based upon the determined order.

11. The system as defined in claim 8, wherein the connection cable comprises a plurality of second optical fibers, the control unit is configured to inject light into each of the second optical fibers so that the light is received in the user interface device via the second optical fibers, the user interface device comprises a plurality of light outlet openings, each light outlet opening being coupleable to one of the second optical fibers for emitting the received light into the region outside the housing of the user interface device when the user interface device is switched off, and each of the light inlet openings is arranged to receive at least part of the light emitted by one of the light outlet openings either upon, it having travelled along an optical path wherein the optical path may correspond to a straight line between the light outlet opening and the light inlet opening or the optical path comprises one or more deflection points, where the light is reflected; or it having been reflected in the region outside of the housing of the user interface device so that the received light is coupled into the first optical fiber coupleable to the respective light inlet opening.

12. The system as defined in claim 8, wherein the control unit is configured to inject light into each of the first optical fibers so that the light is received in the user interface device via the first optical fibers, and the user interface device is configured to emit the light received via the first optical fibers into the region outside the housing of the user interface device via the light inlet openings and to receive light reflected in the region via the light inlet openings so that the received reflected light is injected into the first optical fibers.

13. The system as defined in claim 2, wherein the connection cable comprises at least one transmission wire for transmitting data, wherein the user interface device comprises at least one input means for detecting a user input when the user interface device is supplied with power and wherein the user interface device is configured to transmit a notification about a detected user input to the control unit via the at least one transmission wire of the connection cable.

14. The system as defined in claim 13, wherein the control unit is connected to a controlled device and wherein the control unit is configured to change an operation state of the controlled device in response to a receipt of the notification via the at least one transmission wire.

\* \* \* \* \*